(12) United States Patent
Cercone et al.

(10) Patent No.: US 7,601,239 B1
(45) Date of Patent: Oct. 13, 2009

(54) LIQUID ADHESIVE

(75) Inventors: Lawrence D. Cercone, Frederick, CO (US); James D. Lockwood, Boulder, CO (US)

(73) Assignee: Comptek Structural Composites of Colorado, Inc., Boulder, CO (US)

( * ) Notice: Subject to any disclaimer, the term of this patent is extended or adjusted under 35 U.S.C. 154(b) by 0 days.

(21) Appl. No.: 11/696,527

(22) Filed: Apr. 4, 2007

Related U.S. Application Data

(60) Provisional application No. 60/744,250, filed on Apr. 4, 2006.

(51) Int. Cl.
*C04B 37/00* (2006.01)
*B32B 27/40* (2006.01)

(52) U.S. Cl. .................... 156/325; 428/425.1

(58) Field of Classification Search ............. 156/331.4, 156/325; 428/425.1
See application file for complete search history.

(56) References Cited

U.S. PATENT DOCUMENTS

| 5,026,737 | A | 6/1991 | Ohnuma et al. |
| 5,668,222 | A | 9/1997 | McKinley et al. |
| 5,698,656 | A | 12/1997 | Ohashi et al. |
| 6,288,133 | B1 | 9/2001 | Hagquist |
| 6,368,714 | B1 * | 4/2002 | Robertson et al. ........ 428/425.1 |
| 6,657,035 | B1 | 12/2003 | Nakata et al. |
| 7,098,291 | B2 | 8/2006 | Brinkman |
| 2003/0092867 | A1 | 5/2003 | Sato et al. |
| 2007/0010644 | A1 | 1/2007 | Erickson et al. |

FOREIGN PATENT DOCUMENTS

WO    WO 00/44847    8/2000

OTHER PUBLICATIONS

Material Safety Data Sheet for "SAG 47 foam control agent" Dated Apr. 26, 2006, 7 pages.
Material Safety Data Sheet for "Polyurethane adhesive for wood and wood substrates" Dated Jan. 26, 2007, 4 pages.
Material Safety Data Sheet for "Polyurethane adhesive for wood and wood substrates" Dated Feb. 9, 2006, 5 pages.

* cited by examiner

*Primary Examiner*—Philip C Tucker
*Assistant Examiner*—Michael N Orlando
(74) *Attorney, Agent, or Firm*—Greenlee, Winner and Sullivan, P.C.

(57) ABSTRACT

A low-expanding adhesive composition comprising: a diisocyanate, a surfactant and an activator is provided. The provided adhesive composition cures upon exposure to water. The adhesive composition can be used to bond wood, metal, glass, ceramic, leather, acrylic, PVC and combinations thereof.

14 Claims, No Drawings

LIQUID ADHESIVE

CROSS-REFERENCE TO RELATED APPLICATIONS

This application takes priority from U.S. provisional application Ser. No. 60/744,250 filed Apr. 4, 2006, which is incorporated by reference herein to the extent not inconsistent with the disclosure herewith.

BACKGROUND OF THE INVENTION

Urethane adhesives are known in the art (Modern Plastics Encyclopedia, McGraw-Hill, New York, N.Y.). Urethane adhesives can provide a very strong bond between surfaces to be joined, and they adhere to a wide variety of surface materials including wood, metal, ceramics, glass, most fabrics, leather and most plastics except high density linear polyethylene, polypropylene and Teflon. In addition, urethane adhesives can be provided to the end user as a single component, a stable, flowable liquid having a stable shelf life but capable of curing within minutes when contacted with water, a hygroscopic material, or humid air. Some examples of moisture-cured urethane adhesives include U.S. Pat. Nos. 5,698,656; 6,657,035; 6,368,714; 5,668,222; and WO 00/44847.

It is well known that most urethanes expand during the curing process because the curing reaction yields $CO_2$ gas which remains entrained within the urethane polymer matrix. Many applications of urethane adhesives are specifically designed to exploit the property of expansion during curing, which is advantageous when surfaces to be joined are rough, irregular or contain gaps or holes that make them difficult to bond.

While useful under certain circumstances, the property of expansion during curing can also be a drawback which has limited the utility of urethane adhesives for applications where it is desired to maintain a thin bond line between the surfaces to be joined. Examples of such applications include woodworking, manufacturing, laminating and the like. For these applications, as well as others, it would be desirable to have a low-expanding urethane adhesive.

SUMMARY OF THE INVENTION

The present invention provides a urethane adhesive that can be used for applications where conventional expanding urethane adhesives are unsuitable.

More specifically, provided is a moisture-activated adhesive composition comprising: (a) an aromatic diisocyanate; (b) an activator; and (c) a silicon surfactant. In one embodiment, the percentages by weight of the components in the moisture-activated adhesive composition are 95% or greater by weight of an aromatic polyisocyanate, 1% or less by weight of an activator, and 5% or less by weight of a silicon surfactant. In a particular embodiment, the percentages by weight of the components in the moisture-activated adhesive composition are: 98.85-95.2% by weight Rubinate 9511; 0.15-0.8% by weight DMDEE; and 1-4% by weight SAG 47. In particular embodiments, the moisture-activated adhesive composition comprises, consists essentially of, or consists of: 97.2% by weight Rubinate 9511; 0.3% by weight DMDEE; and 2.5% by weight SAG 47.

Also provided is a method for bonding surfaces together comprising: applying to a first surface a moisture-activated adhesive composition disclosed herein; contacting said first surface with a second surface; and curing the adhesive composition. As used herein, "bonding" means the surfaces are permanently or semi-permanently attached, so that the surfaces will not separate until application of a desired level of force.

The curing step can be performed in different ways, depending on the environment where the adhesive composition is being used, as well as the surfaces which are being bonded. For example, one or more surfaces can be sprayed with water or an aqueous substance. Alternatively or in combination, the bonding method can be performed in a humid environment, defined as one having sufficient humidity for the reaction to occur to the desired extent. In one example, a humid environment has above 5% relative humidity. There may be an optional "setting" step where the adhesive is allowed to set before the surfaces are attached, allowing some portion of any $CO_2$ that is generated to escape.

Also provided is a method for making a moisture-activated adhesive composition comprising combining: (a) between 98.85 and 95.2% by weight Rubinate 9511; (b) between 0.15 and 0.8% by weight DMDEE; and (c) between 1 and 4% by weight SAG 47. In a particular embodiment, 97.2% by weight Rubinate 9511; 0.3% by weight DMDEE; and 2.5% by weight SAG 47 are combined to make the moisture-activated adhesive composition.

DETAILED DESCRIPTION OF THE INVENTION

The invention is further described by the following non-limiting examples:

Aromatic diisocyanates useful in the invention are those which in their monomer form have one or more aromatic functionalities and two isocyanate functionalities. Specific examples of aromatic diisocyanates useful in the invention include, e.g., p-phenylene diisocyanate; m-phenylene diisocyanate; 2,4-toluene diisocyanate; 2,6-toluene diisocyanate; 2,4'-diphenyl methane diisocyanate (2,4'-MDI); 4,4'-diphenylmethane diisocyanate (4,4'-MDI); and mixtures thereof.

One example of a useful aromatic diisocyanate is a MDI, such as Rubinate 9511. Rubinate 9511 is a commercially available pre-polymerized resin of 3000-5000 average MW manufactured by Huntsman Chemical Company Detroit, Mich. If the molecular weight of the resin is too low, the adhesive composition becomes elastic. If the molecular weight of the resin is too high, the adhesive composition becomes brittle. The monomeric chemical composition is principally methylene diphenyl 4,4'-di isocyanate (hereinafter "4,4'-MDI"). Rubinate 9511 also contains small percentages of 2,4'-diisocyanate and 2,2'-diisocyanate isomers. Alternatively, a TDI (toluene diisocyanate) can be used, as known in the art. Commercial TDI products are a mixture of the 2,4'- and 2,6'-isomers.

One useful MDI resin is 4,4'-MDI, with the amounts of 2,2'-MDI and 2,4'-MDI minimized to the extent consistent with cost and commercial availability. As the content of 4,4'-MDI is increased, the flexibility of the cured resin is increased. In most applications, the bonded materials are themselves capable of flexing to some extent, and the bond joining the materials is preferably flexible to a similar extent.

Activators (also known as catalysts) useful in curing reactions are known in the art. One such activator is DMDEE or similar materials. DMDEE is 2'-Dimorpholino diethyl ether, available from, e.g. Huntsman Chemical Co., Detroit, Mich. DMDEE is the primary catalyst used herein, typically described as a fast-blowing catalyst which is used extensively in the manufacture of many polyurethanes. Materials similar to DMDEE include those wherein the diethyl ether groups are replaced with di(alkyl)ether groups having from 1 to 6 carbons in each alkyl chain.

Useful silicon surfactants include dimethylsiloxanes, and polydimethylsiloxanes. One such useful silicon surfactant is SAG 47, available from General Electric, Uniontown, W. Va.

The amount of Rubinate 9511, in terms of percent by weight can be adjusted as desired, to compensate for variation in the amounts of DMDEE and SAG 47 used in the formulation. The effect of increasing the amount of DMDEE is to shorten the curing time and to reduce the time for working with the parts to be joined. The practical working time is conveniently assessed by the time in which the curing process results in the adhesive becoming tacky, or begins to set. The time to tack is an approximate measure of the time available for joining and clamping to be done without sacrificing bond strength.

Various tests are used by those of skill in the art to measure time to tack in a reproducible fashion. At 0.3% by weight DMDEE, for example, the described adhesive becomes tacky in about 30 minutes, which is considered optimal for hand-operated joining and clamping operations. About 15 minutes tack time can be achieved using 0.7% by weight DMDEE, which could be advantageous for automated processes such as lamination.

The quantity of SAG 47 can also be varied, as desired, for the desired characteristics of the adhesive. The lower limit is governed by expansion of the adhesive during curing. A criterion used herein is that no increase in bond thickness should occur during curing when two 4 inch by 6 inch blocks of wood are coated with adhesive and clamped. Reduction in bond strength can occur at increased levels of SAG 47, the practical upper limit being about 4.0% by weight.

All variations in DMDEE and SAG 47 content are compensated by adjustment of the MDI content, to yield a sum of 100% by weight of all components.

Optimally, a water scavenger, such as p-toluenesulfonyl isocyanate (PTSI) can be included in the formulation at 1% or less by weight, to further stabilize the formulation and to prevent premature curing caused by residual water which might be present in other components.

Other optional additives, such as processing additives, fungicides, tackifiers, adhesion promoters, flame retardants, antioxidants, ultraviolet light stabilizers, fillers and combinations thereof may be added. These additives may be added in any suitable amount, and preferably are present in an amount less than 1% by weight.

The adhesive compositions of the invention are designed to have low expansion. In particular embodiments, the adhesive compositions of the invention have unconstrained expansion of a maximum of 300% by volume, in comparison to prior known adhesive compositions which commonly have unconstrained expansion in excess of 1000% by volume. Unconstrained expansion means there is no clamping used during a bonding process. The curing temperature is any suitable temperature. Room temperature may be used. As will be apparent by one of ordinary skill in the art, a temperature above the water freezing point should be used because water is the catalyst in the process.

The adhesive of the present invention is provided as a flowable liquid. The adhesive of the present invention is stable (remains uncured) for a time measured in months or years. In certain embodiments, the adhesive of the present invention is stable in a bottle at room temperature for over a year. The quantity of adhesive to be dispensed can be controlled by hand or mechanical means. The surfaces to be joined can be clamped together and allowed to cure, the resulting bond line being essentially as thin as desired without sacrificing the strength typical of urethane adhesive bonds.

The adhesive composition can be used to bond many substances and combinations of substances (where one surface is one material and another surface is a different material). Some examples of the substances which can be bonded include: wood, metal, glass, ceramic, leather, acrylic, PVC and combinations thereof.

The surfaces to be bonded can be sanded before use and cleaned, if necessary, with alcohol, or other solvent to remove particulate matter or foreign substances such as oil or dirt. After application of the adhesive composition, the surfaces can be clamped, if necessary, using any suitable clamping method, as known in the art. The adhesive composition can be painted or sanded after curing, if desired.

Example 1

Formulation Example

Table 1 lists one exemplary formulation of the urethane adhesive of the invention.

TABLE 1

| Material | Percent by Weight | Grams per Batch |
| --- | --- | --- |
| Rubinate 9511 | 97.2 | 19440.00 |
| DMDEE | 0.3 | 60.00 |
| SAG 47 | 2.5 | 500.00 |
| Total | 100.00 | 20000.00 |

Example 2

Mixing Example

The following example describes preparation of a five gallon batch of the urethane adhesive.

Weighing

1. Weigh out 19440 grams of Rubinate 9511 into a clean 5 gallon plastic bucket.

2. Weigh out 60 grams of DMDEE into a clean plastic cup.

3. Weigh out 500 grams of SAG 47 into a clean plastic cup.

4. Set aside until ready to mix.

Mixing (Mix at <5% Relative Humidity)

1. In the 5 gallon bucket containing the Rubinate 9511 add 60 grams of DMDEE and 500 grams of SAG 47.

2. Place the bucket in the low shear Myers mixer.

3. Start the mixer and mix for 60 minutes.

4. After mixing put cover on the 5 gallon container and set aside until ready to package.

All mixing operations were carried out at room temperature in an atmosphere of air having no more than 5% relative humidity to minimize the potential for premature curing.

The process can be scaled up easily, as known in the art. For example, if a continuous mixture process is used, the three components are combined together in the proper volume ratio and passed into a static mixer.

The foregoing specific embodiment is an example of a urethane adhesive of the invention. Other embodiments within the scope of the invention can be formulated by those skilled in the art, following the teachings and principles set forth herein.

Every formulation or combination of components described or exemplified can be used to practice the invention, unless otherwise stated. Specific names of compounds are intended to be exemplary, as it is known that one of ordinary skill in the art can name the same compounds differently. One of ordinary skill in the art will appreciate that methods, uses and components other than those specifically exemplified can be employed in the practice of the invention without resort to undue experimentation. All art-known functional equivalents, of any such methods, uses and components are intended to be included in this invention. Whenever a range is given in the specification, for example, a composition component weight range, all intermediate ranges and subranges, as well as all individual values included in the ranges given are intended to be included in the disclosure to the extent as if individually listed.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In general the terms and phrases used herein have their art-recognized meaning, which can be found by reference to standard texts, journal references and contexts known to those skilled in the art. The definitions are provided to clarify their specific use in the context of the invention.

All patents and publications mentioned in the specification are indicative of the levels of skill of those skilled in the art to which the invention pertains.

One skilled in the art would readily appreciate that the present invention is well adapted to carry out the objects and obtain the ends and advantages mentioned, as well as those inherent therein. The adhesive composition components, percentages, uses and curing methods described herein are exemplary and are not intended as limitations on the scope of the invention. Changes therein and other uses will occur to those skilled in the art, which are encompassed within the spirit of the invention, are defined by the scope of the claims.

Although the description herein contains many specificities, these should not be construed as limiting the scope of the invention, but as merely providing illustrations of some of the embodiments of the invention. Thus, additional embodiments are within the scope of the invention and within the following claims. All references cited herein are hereby incorporated by reference to the extent that there is no inconsistency with the disclosure of this specification. Some references provided herein are incorporated by reference herein to provide details concerning additional useful materials and additional uses of the invention.

We claim:

1. A moisture-activated adhesive composition consisting essentially of:
    98.85-95.2% by weight of an aromatic diisocyanate prepolymerized resin of 3000-5000 average MW comprising methylene diphenyl 4,4'-di isocyanate, 2,4'-diisocyanate and 2,2'-diisocyanate isomers;
    0.15-0.8% by weight 2'-dimorpholine diethyl ether; and
    1-4% by weight polydimethylsiloxane surfactant; wherein the adhesive has unconstrained expansion of a maximum of 300% by volume.

2. The moisture-activated adhesive composition of claim 1, wherein the percentages by weight of the components in the moisture-activated adhesive composition are: 97.2% by weight of the aromatic diisocyanate prepolymerized resin; 0.3% by weight 2'-dimorpholine diethyl ether; and 2.5% by weight polydimethylsiloxane surfactant.

3. The moisture-activated adhesive composition of claim 1, consisting essentially of: 97.2% by weight of the aromatic diisocyanate prepolymerized resin; 0.3% by weight 2'-dimorpholine diethyl ether; and 2.5% by weight polydimethylsiloxane surfactant.

4. The moisture-activated adhesive composition of claim 1, consisting of: 97.2% by weight of the aromatic diisocyanate prepolymerized resin; 0.3% by weight 2'-dimorpholine diethyl ether; and 2.5% by weight polydimethylsiloxane surfactant.

5. A method for bonding surfaces together comprising:
    applying to a first surface a moisture-activated adhesive composition consisting essentially of: 98.85-95.2% by weight of an aromatic diisocyanate prepolymerized resin of 3000-5000 average MW comprising methylene diphenyl 4,4'-di isocyanate, 2,4'-diisocyanate and 2,2'-diisocyanate isomers; 0.15-0.8% by weight 2'-dimorpholine diethyl ether; and
    1-4% by weight polydimethylsiloxane surfactant;
    contacting said first surface with a second surface under curing conditions; and
    curing the adhesive composition wherein the adhesive has unconstrained expansion of a maximum of 300% by volume.

6. The method of claim 5, wherein the curing step is performed by applying water to at least one of the first and second surfaces.

7. The method of claim 5, wherein the curing step is performed by applying the adhesive composition in a humid environment.

8. The method of claim 5, wherein the adhesive composition consists of: 97.2% by weight of the aromatic diisocyanate prepolymerized resin; 0.3% by weight 2'-dimorpholine diethyl ether; and 2.5% by weight polydimethylsiloxane surfactant.

9. The method of claim 5, wherein the surfaces are selected from the group consisting of: wood, metal, glass, ceramic, leather, acrylic, PVC and combinations thereof.

10. The method of claim 5, wherein the adhesive composition consists essentially of:
    98.85-95.2% by weight of the aromatic diisocyanate prepolymerized resin;
    0.15-0.8% by weight 2'-dimorpholine diethyl ether; and
    1-4% by weight polydimethylsiloxane surfactant.

11. The method of claim 5, wherein the adhesive composition consists of:
- 98.85-95.2% by weight of the aromatic diisocyanate prepolymerized resin;
- 0.15-0.8% by weight 2'-dimorpholine diethyl ether; and
- 1-4% by weight polydimethylsiloxane surfactant.

12. A moisture-activated adhesive composition by combining the components consisting essentially of:
- 98.85-95.2% by weight of an aromatic diisocyanate prepolymerized resin of 3000-5000 average MW comprising methylene diphenyl 4,4'-di isocyanate, 2,4'-diisocyanate and 2,2'-diisocyanate isomers;
- 0.15-0.8% by weight 2'-dimorpholine diethyl ether; and
- 1-4% by weight polydimethylsiloxane surfactant, to form a homogenous liquid with an unconstrained expansion of a maximum of 300% by volume.

13. The method of claim 12, wherein the components consist of:
- 98.85-95.2% by weight of the aromatic diisocyanate prepolymerized resin;
- 0.15-0.8% by weight 2'-dimorpholine diethyl ether; and
- 1-4% by weight polydimethylsiloxane surfactant.

14. The method of claim 12, wherein the components consist of:
- 97.2% by weight of the aromatic diisocyanate prepolymerized resin; 0.3% by weight 2'-dimorpholine diethyl ether; and 2.5% by weight polydimethylsiloxane surfactant.

* * * * *

UNITED STATES PATENT AND TRADEMARK OFFICE
CERTIFICATE OF CORRECTION

PATENT NO. : 7,601,239 B1
APPLICATION NO. : 11/696527
DATED : October 13, 2009
INVENTOR(S) : Lawrence D. Cercone and James D. Lockwood It is certified that error appears in the above-identified patent and that said Letters Patent is hereby corrected as shown below:

In the Claims:

Column 7, Line 7, Claim 12, please replace "A moisture-activated" with --A method for making a moisture-activated--.

Signed and Sealed this

Sixth Day of April, 2010

David J. Kappos
*Director of the United States Patent and Trademark Office*